United States Patent
Paoletti

(10) Patent No.: US 9,434,099 B2
(45) Date of Patent: Sep. 6, 2016

(54) EXTRUSION MACHINE WITH IMPROVED TEMPERATURE CONTROL SYSTEM

(71) Applicant: SEMPLICE S.P.A., Milan (IT)

(72) Inventor: Stefano Paoletti, Ascoli Piceno (IT)

(73) Assignee: SEMPLICE S.P.A., Milan (IT)

(*) Notice: Subject to any disclaimer, the term of this patent is extended or adjusted under 35 U.S.C. 154(b) by 0 days.

(21) Appl. No.: 14/360,278

(22) PCT Filed: Nov. 19, 2012

(86) PCT No.: PCT/EP2012/072998
§ 371 (c)(1),
(2) Date: May 22, 2014

(87) PCT Pub. No.: WO2013/076042
PCT Pub. Date: May 30, 2013

(65) Prior Publication Data
US 2014/0322378 A1 Oct. 30, 2014

(30) Foreign Application Priority Data

Nov. 23, 2011 (IT) .............................. MI2011A2128

(51) Int. Cl.
*B29C 47/82* (2006.01)
*B29C 47/66* (2006.01)
(Continued)

(52) U.S. Cl.
CPC .......... *B29C 47/82* (2013.01); *B29C 47/0009* (2013.01); *B29C 47/625* (2013.01); *B29C 47/627* (2013.01); *B29C 47/66* (2013.01); *B29C 47/822* (2013.01); *B29C 47/825* (2013.01); *B29C 47/92* (2013.01); *B29C 47/0847* (2013.01);
(Continued)

(58) Field of Classification Search
CPC ... B29C 47/82; B29C 47/627; B29C 47/625; B29C 47/66; B29C 47/825; B29C 47/0847; B29C 47/822; B29C 2947/92895; B29C 2947/92209; B29C 2947/924; B29C 47/805
See application file for complete search history.

(56) References Cited

U.S. PATENT DOCUMENTS 2,640,033 A * 5/1953 Marshall ........................ 510/145
3,218,671 A * 11/1965 Justus et al. ................... 425/144
(Continued)

FOREIGN PATENT DOCUMENTS

CN 201736434 U 2/2011
EP 0135922 4/1985
(Continued)

OTHER PUBLICATIONS

Halleran, L. Michael, Beryllium Copper, R&F Alloy Wires, Inc, 1999, 6 pages, http://www.rfalloy.com/springs96.htm.*
(Continued)

*Primary Examiner* — Yogendra Gupta
*Assistant Examiner* — Emmanuel S Luk
(74) *Attorney, Agent, or Firm* — Koppel, Patrick, Heybl & Philpott

(57) ABSTRACT

An extrusion machine with improved structure, comprising an internally hollow extrusion cylinder, at least one heating element associated with the extrusion cylinder, at least one cooling fan which engages the outer surface of the extrusion cylinder, and at least one temperature probe which is inserted in the extrusion cylinder, the temperature probe facing the cavity of the extrusion cylinder and the temperature probe being adapted to be in direct contact with the extrusion material contained in the cavity of the extrusion cylinder.

10 Claims, 5 Drawing Sheets

(51) Int. Cl.
  *B29C 47/92* (2006.01)
  *B29C 47/00* (2006.01)
  *B29C 47/62* (2006.01)
  *B29C 47/08* (2006.01)

(52) U.S. Cl.
  CPC ............... *B29C 2947/924* (2013.01); *B29C 2947/92209* (2013.01); *B29C 2947/92704* (2013.01); *B29C 2947/92895* (2013.01)

(56) References Cited

U.S. PATENT DOCUMENTS

| | | | | |
|---|---|---|---|---|
| 3,369,594 | A | * | 2/1968 | Farrell .................. 165/263 |
| 3,628,381 | A | | 12/1971 | Aronow et al. |
| 3,743,252 | A | * | 7/1973 | Schott, Jr. ................ 366/145 |
| 3,866,669 | A | * | 2/1975 | Gardiner ................ 165/254 |
| 3,909,760 | A | * | 9/1975 | Kraus .................. 336/84 R |
| 4,072,185 | A | * | 2/1978 | Nelson ............... B29C 47/82 165/122 |
| 4,155,690 | A | | 5/1979 | Checkland |
| 4,290,986 | A | | 9/1981 | Koschmann |
| 4,324,493 | A | * | 4/1982 | Colombo ............ B29C 47/745 264/53 |
| 4,480,981 | A | * | 11/1984 | Togawa et al. ............ 425/143 |
| 4,634,361 | A | * | 1/1987 | Piazzola .................. 425/190 |
| 4,667,852 | A | | 5/1987 | Seimann |
| 4,758,146 | A | * | 7/1988 | Piazzola ............... B29C 35/00 219/201 |
| 4,921,355 | A | * | 5/1990 | Kuhler .................. 366/146 |
| 5,200,205 | A | | 4/1993 | Wissmann et al. |
| 5,224,383 | A | | 7/1993 | Pinto et al. |
| 5,447,190 | A | * | 9/1995 | Denisart et al. ............ 165/64 |
| 6,755,564 | B2 | * | 6/2004 | Eiva .................. 366/145 |
| 6,852,257 | B2 | * | 2/2005 | Eiva .................. 264/40.6 |
| 8,674,716 | B2 | * | 3/2014 | Sato et al. ........... 324/755.05 |
| 2004/0089074 | A1 | * | 5/2004 | Avisse ................. 73/726 |
| 2005/0073067 | A1 | * | 4/2005 | Noriega Escobar et al. .............. 264/40.1 |
| 2007/0134365 | A1 | * | 6/2007 | Grimm ................ 425/547 |
| 2009/0096120 | A1 | * | 4/2009 | Subramonian et al. ..... 264/40.1 |
| 2011/0285417 | A1 | * | 11/2011 | Kimoto .............. 324/755.07 |
| 2012/0090819 | A1 | * | 4/2012 | Christiano .......... B29C 47/0811 165/96 |
| 2013/0313234 | A1 | * | 11/2013 | Rokkaku et al. ........ 219/121.64 |

FOREIGN PATENT DOCUMENTS

| | | |
|---|---|---|
| JP | 58108120 A | 6/1983 |
| JP | 58126131 | 7/1983 |

OTHER PUBLICATIONS

IBC Advanced Alloys Corp, Alloy Selection for the Oil and Gas Industry, 2008, 4 pages, http://www.ibcadvancedalloys.com/clientuploads/Technical%20Resources/OGE_Whitepaper_R2.pdf.*
Amitava Guha, Properties of Beryllium Coppyer, Bush Wellman, 1982, 8 pages.*
International Search Report (PCT/ISA/210) for PCT/EP2012/072998 dated Mar. 15, 2013 and Written Opinion of the International Searching Authority (PCT/ISA/237).
Italian Search Report for Italian Patent Application No. MI20112128 dated Jul. 24, 2012 and Written Opinion.
Communication from European Patent appl. No. 12787455.0-1706. dated May 8, 2015.
Examination Report from European Patent appl. No. 12787455.0-1706, dated Jul. 8, 2015.
Gefran TCM Mineral oxide thermocouple available info sheets. available from www.gefran.com. 2 pages © 2008.
Gefran info page for TCE mineral oxide thermocouple, available from www.gefran.com. 1 page.
Samp, prior use. Jan. 15, 2010, 7 pages.
Sampsistemi, available from www.sampsistemi.com, product information. 22 pages, 2009.
Beryllium copper, definition from Wikipedia. four pages. © Dec. 2014.

* cited by examiner

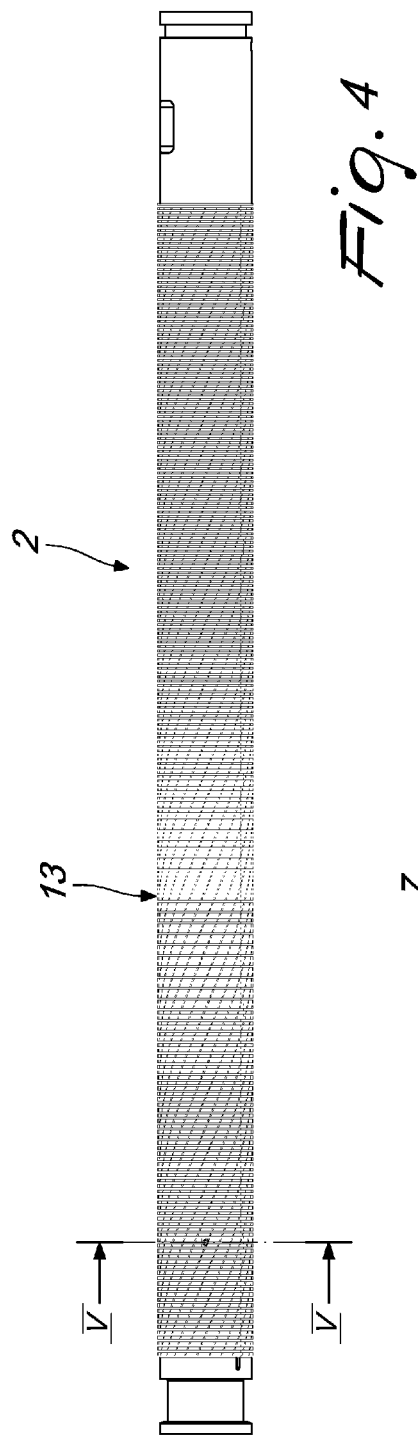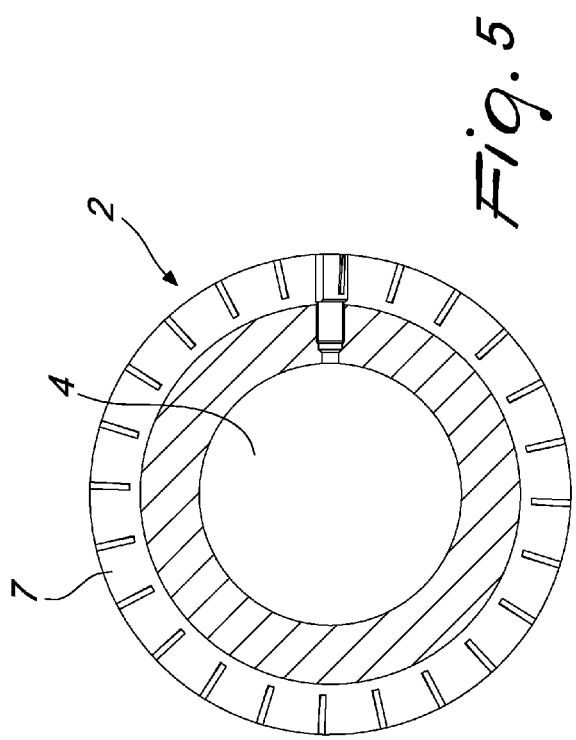

EXTRUSION MACHINE WITH IMPROVED TEMPERATURE CONTROL SYSTEM

The present invention relates to an extrusion machine with improved structure, particularly for thermoplastic compounds.

Currently, international standards regarding self-extinguishing or flame-retardant wires (HFFR Halogen Free Flame Retardant) and with low emission of smoke, as well as halogen-free in the event of combustion (LSOH, Low Smoke Zero Halogen), have forced manufacturers of compounds to provide thermoplastic compounds that are difficult to work because of the large amount of heat generated during the working of such thermoplastic compounds due to their high viscosity. The excess heat suffers the drawback of deteriorating the material itself.

Such thermoplastic compounds are generally worked in extrusion machines that, in view of the technical difficulties mentioned above and caused by the particular composition of said compounds, have extrusion speeds reduced by 50% or more with respect to the working of thermoplastic compounds of the ordinary type, with a consequent reduction in productivity and increase in costs.

Conventional extrusion machines are not devoid of further drawbacks, including the fact that they have inefficient temperature regulation systems for working thermoplastic compounds that are difficult to work.

In fact, such conventional extrusion machines do not allow precise control of the temperature of the material being worked; consequently, since in thermoplastic compounds of hard workability the working temperature is close to the degradation temperature of said compounds, the production rate must be reduced in order to allow the operators to ascertain that this degradation temperature is not reached.

Another drawback of these conventional extrusion machines resides in the fact that the temperature regulation systems have temperature sensors that are inaccurate for measuring the temperature of the working material.

A further drawback of these conventional extrusion machines resides in the fact that they have inefficient cooling systems, and in that they therefore further degrade the efficiency of temperature regulation systems of the known type.

The aim of the present invention is to provide an extrusion machine, particularly for thermoplastic compounds, that solves the technical problems described above, obviates the drawbacks and overcomes the limitations of the background art, allowing an optimization of the productivity of the extrusion line, increasing its working speed.

Within this aim, an object of the present invention is to provide an extrusion machine that allows quick and precise control of the working temperature.

Another object of the invention is to provide an extrusion machine that ensures a high quality of work output.

A further object of the invention is to provide an extrusion machine that can ensure highest reliability and safety of use.

Another object of the invention is to provide an extrusion machine that is easy to provide and economically competitive in comparison to the background art.

This aim and these and other objects that will become more apparent hereinafter are achieved by an extrusion machine with improved structure, comprising an internally hollow extrusion cylinder, at least one heating element associated with said extrusion cylinder, at least one cooling fan which engages the outer surface of said extrusion cylinder, and at least one temperature probe which is inserted in said extrusion cylinder, characterized in that said temperature probe faces the cavity of said extrusion cylinder, said temperature probe being adapted to be in direct contact with the extrusion material contained in said cavity of said extrusion cylinder.

Further characteristics and advantages of the invention will become more apparent from the description of a preferred but not exclusive embodiment of an extrusion machine, particularly for thermoplastic compounds, illustrated by way of non-limiting example in the accompanying drawings, wherein:

FIG. 4 is a side elevation view of the extrusion cylinder of the extrusion machine illustrated in the preceding figures;

FIG. 5 is a sectional view of the extrusion cylinder illustrated in FIG. 4, along the line V-V;

Figure 1:
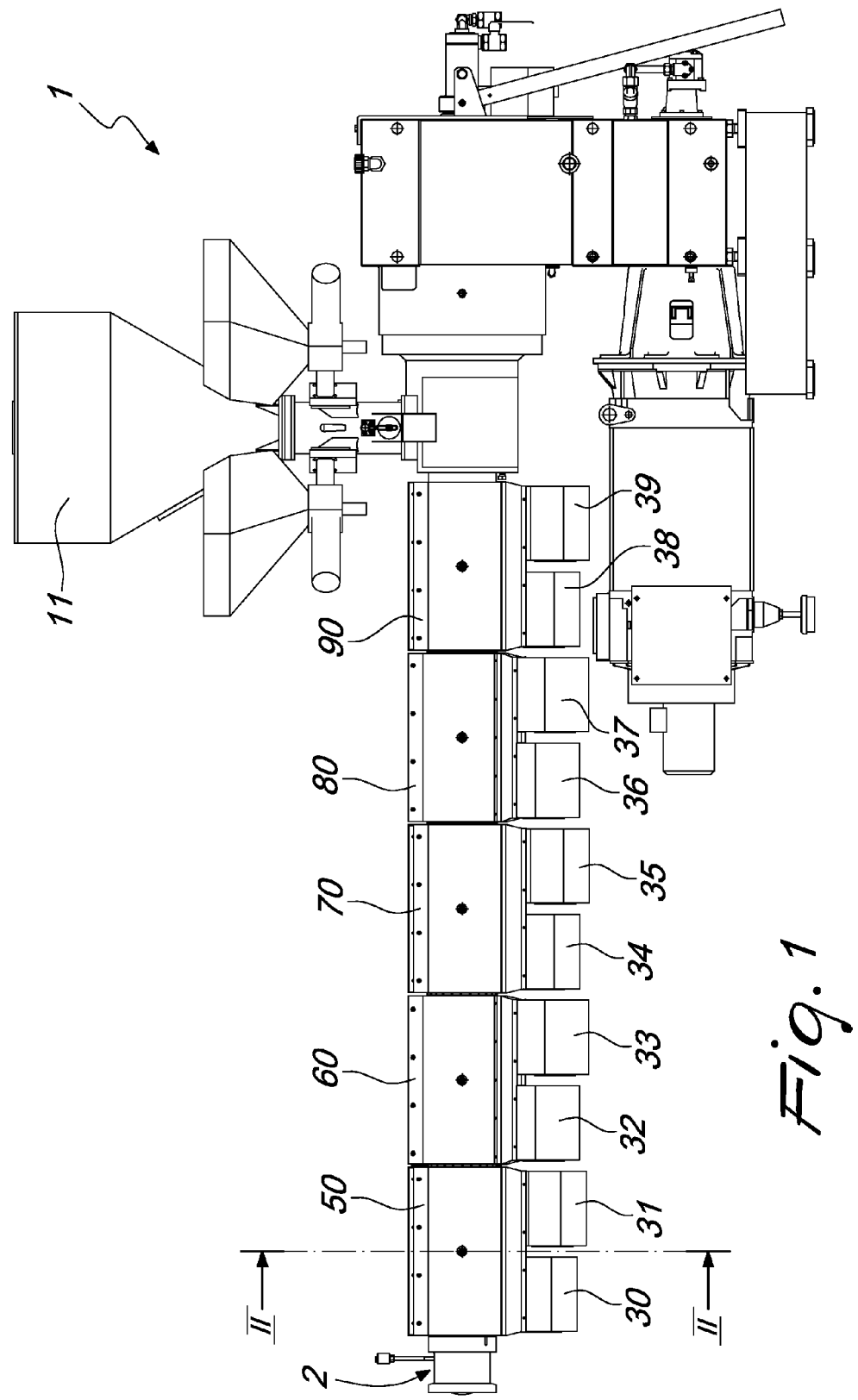
FIG. 1 is a side elevation view of an embodiment of an extrusion machine according to the invention.
Figure 2:
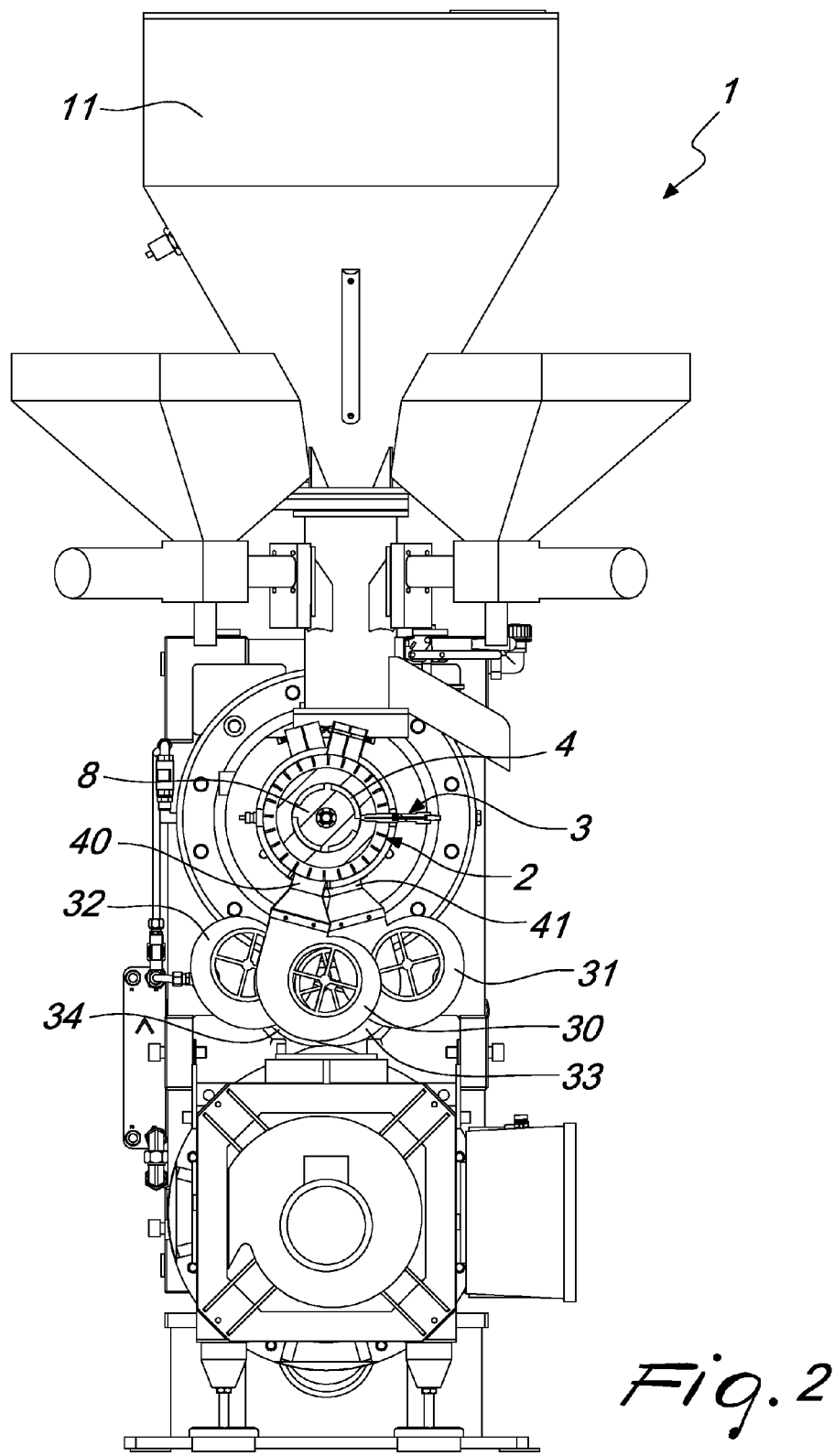
FIG. 2 is a sectional view of the extrusion machine illustrated in FIG. 1, along the line II-II.
Figure 3:
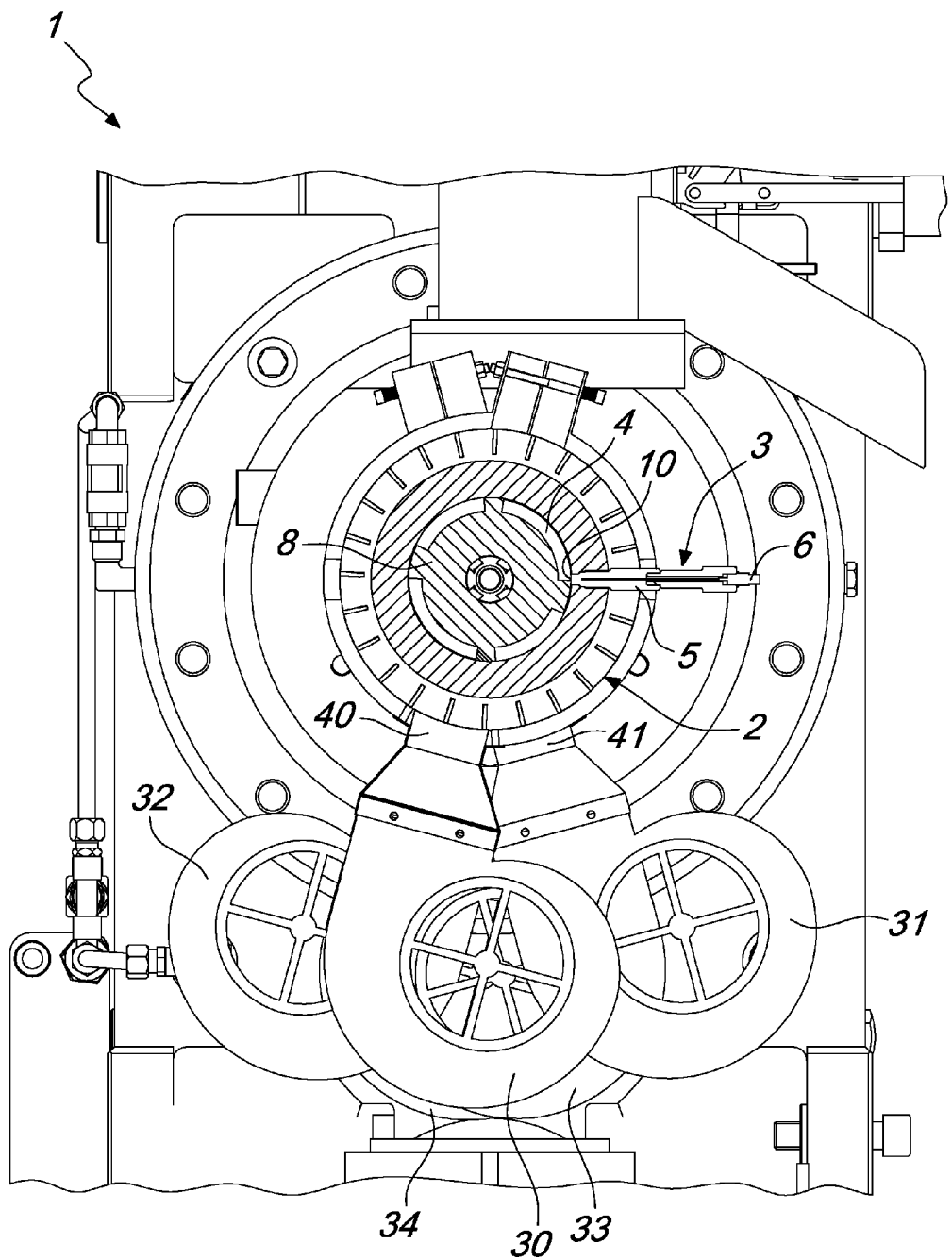
FIG. 3 is an enlarged-scale view of a detail of the extrusion machine illustrated in FIG. 2.

With reference to the cited figures, the extrusion machine with improved structure, particularly for thermoplastic compounds, generally designated by the reference numeral 1, comprises an internally hollow extrusion cylinder 2, at least one heating element, conveniently constituted by one or more heaters arranged proximate to the outer surface of the extrusion cylinder 2, at least one cooling fan 30-39 which engages the outer surface of the extrusion cylinder 2, and at least one temperature probe 3 inserted in the extrusion cylinder 2.

According to the invention, the temperature probe 3 faces directly and internally the cavity 4 of the extrusion cylinder 2, and in particular, in the case of an extrusion machine of the single-screw type illustrated in the accompanying figures, the temperature probe 3 faces the cavity that originates between the inner surface of the extrusion cylinder 2 and the outer surface of the extrusion screw 8.

This extrusion machine 1 is adapted also to work materials of a different type, such as for example elastomeric or thermosetting compounds.

According to this configuration, the temperature probe 3 is advantageously adapted to make contact with the thermoplastic compound that is contained in the cavity 4 of the extrusion cylinder 2 and worked by means of the extrusion screw 8, during the extrusion process.

The temperature probe 3 comprises advantageously a casing 5 that is inserted in the extrusion cylinder 2 and a thermocouple 6 inserted in the casing 5 in the extrusion cylinder 2.

The casing 5 is made of a thermally conducting and mechanically strong material, such as for example beryllium bronze. The shape of the casing 5, which is thin and elongated, with a diameter generally in the order of 2 millimeters, also contributes to the mechanical resistance to high pressures, and to thermal conduction. Said casing in fact has to withstand temperatures even in the order of 400° C. and pressures even of 1000 bars.

The casing 5 is advantageously inserted in an adapted threaded hole provided on the outer surface of the extrusion cylinder 2, so that the casing 5 can be screwed and unscrewed with respect to the extrusion cylinder 2, in order to be removed and replaced when required. The casing 5 has an end 10 that makes direct contact with the thermoplastic compound being worked, adapting its own temperature to the temperature of said compound, thanks to the excellent thermal conduction properties of the material of which it is made. The presence of the thread, between the body of the extrusion cylinder 2 and the outer lateral surface of the casing 5, produces a thermal discontinuity between the extrusion cylinder 2 and the casing 5, because of the reduction in the points of contact between the extrusion cylinder 2 and the casing 5, that ensures that the casing 5 reaches the temperature of the thermoplastic compound, substantially without being affected by the temperature of the material of the extrusion cylinder 2 proper.

The thermocouple 6 comprises advantageously terminals made of iron and constantan. The thermocouple 6 also can be replaced without the necessity of replacing the casing 5.

In the embodiment illustrated in the accompanying figures, the extrusion machine 1 comprises 5 working stations 50, 60, 70, 80 and 90 arranged longitudinally along the extension of the extrusion cylinder 2; each working station comprises advantageously a temperature probe 3, two cooling fans 30-39 and at least one heating element, which faces the outer surface of the extrusion cylinder 2, to regulate the working temperature.

The fans 30-39 are arranged in a lower position than the extrusion cylinder 2 and are angled in an alternate manner in order to better distribute the air flow and avoid concentrating the cooling on a single longitudinal line of the extrusion cylinder 2. Advantageously, the cooling fans 30-39 each comprise an outlet 40, 41 that affects a different portion of the lateral surface of the extrusion cylinder 2.

The fans 30-39 are advantageously arranged in a discontinuous and alternating manner. They are angled in an alternating manner, for example at angles of +/−10° and/or +/−15°, so that the outlet of each one faces several portions of the lateral surface of the extrusion cylinder 2, so that the air flow that exits from the several fans 30-39 also has an angle of incidence to the lateral surface of the extrusion cylinder 2 that is different from the adjacent fans.

The extrusion cylinder 2 comprises advantageously cooling fins 7 all around its outer lateral surface.

These fins 7 have a thickness that can vary longitudinally with respect to the axis of the extrusion cylinder 2, in relation to the amount of heat to be dissipated at the several points of the extrusion cylinder 2.

Figure 6:
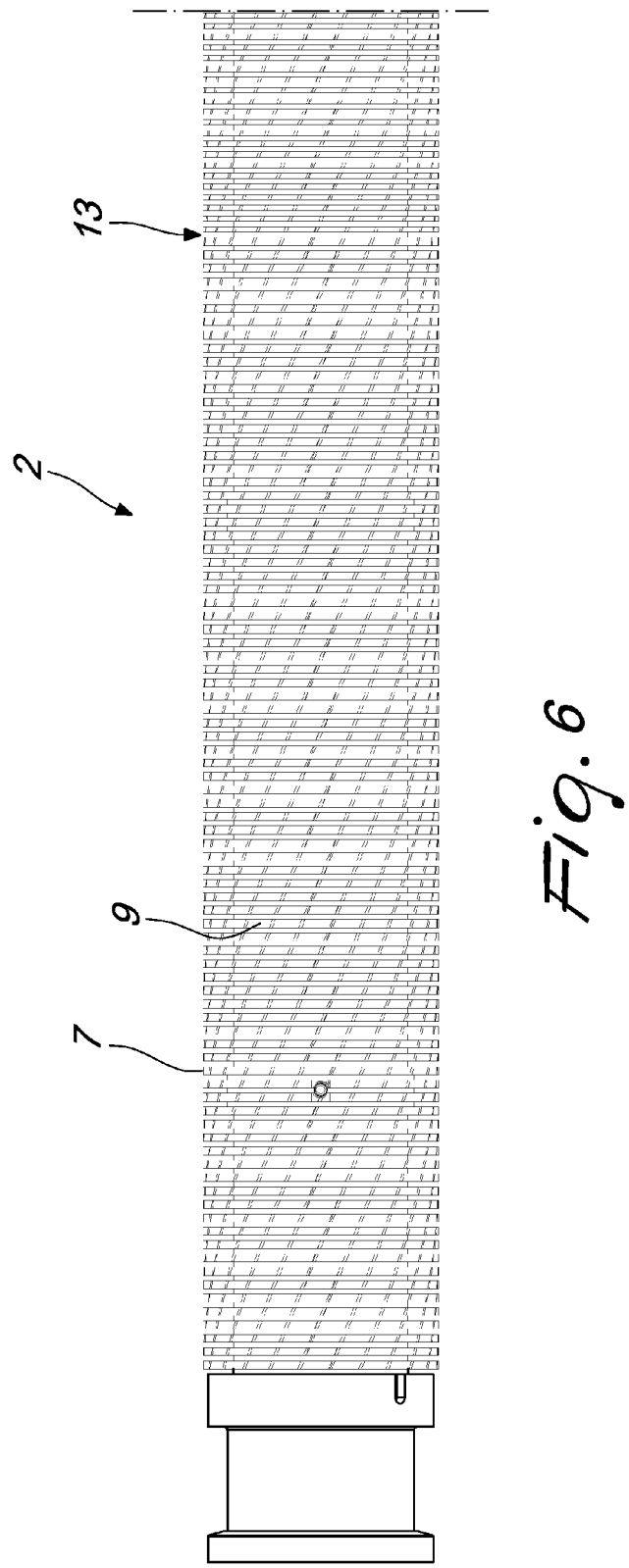
FIG. 6 is an enlarged-scale view of a detail of the extrusion cylinder illustrated in FIG. 4.

In a preferred embodiment of the cooling fins 7, they are denser, i.e., of smaller thickness, for example in the order of 5 millimeters, proximate to the initial part of the extrusion cylinder 2, i.e., proximate to the hopper 11 for inserting the thermoplastic material, and less dense, i.e., of greater thickness, for example in the order of 10 millimeters, proximate to the outlet of the extrusion cylinder 2. FIGS. 4 and 6 illustrate the cooling fins 7 of the extrusion cylinder 2, and in particular the region of transition 13 from a configuration with thinner fins to a configuration with thicker fins.

Advantageously, for providing the best dissipation of the excess heat, the extrusion cylinder 2 and the cooling fins 7 are provided in a single block of material.

The cooling fins 7 comprise further a plurality of helical cuts 9 that lie longitudinally with respect to the axis of the extrusion cylinder 2, around the lateral surface thereof, in a number that can vary from 6 to 24, according to different embodiments.

Operation of the extrusion machine with improved structure, particularly for thermoplastic compounds, is described hereinafter.

In the embodiment illustrated in the accompanying figures, the presence of a temperature probe 3 that faces the cavity 4 that is internal to the extrusion cylinder 2 and external to the extrusion screw 8, i.e., that is in direct contact with the thermoplastic compound during working, ensures the accurate and quick measurement of the temperature of the compound. Starting from this information about the temperature of the compound, a control temperature regulator unit, which is mounted on the machine, controls, for example with controls of the PID (Proportional Integral Derivative) type, the operation of the cooling fans and the heating elements, so as to maintain the desired working temperature of the thermoplastic compound.

In practice it has been found that the extrusion machine according to the present invention achieves the intended aim and objects, since it allows improving the productivity of the extrusion line, increasing the production rate and quality with respect to the background art.

Another advantage of the extrusion machine according to the invention resides in the fact that it ensures quick and precise control of the working temperature, and in particular of the temperature of the thermoplastic compound being worked.

A further advantage of the extrusion machine according to the invention resides in the fact that the data of the temperature of the thermoplastic compound being worked are very accurate and are transmitted practically immediately, allowing regulation of the working temperature without significant delays.

Another advantage of the extrusion machine according to the invention resides in the fact that it allows an efficient cooling of the thermoplastic compound, also as a function of the actual temperature thereof.

The extrusion machine particularly for thermoplastic compounds thus conceived is susceptible of numerous modifications and variations, all of which are within the scope of the appended claims.

All the details may further be replaced with other technically equivalent elements.

In practice, the materials used, as long as they are compatible with the specific use, as well as the contingent shapes and dimensions, may be any according to requirements.

The disclosures in Italian Patent Application No. MI2011A002128 from which this application claims priority are incorporated herein by reference.

The invention claimed is:

1. An extrusion machine with improved structure, comprising an internally hollow extrusion cylinder, at least one heating element associated with said extrusion cylinder, at least one cooling fan which engages an outer surface of said extrusion cylinder, and at least one temperature probe which is inserted in said extrusion cylinder, wherein said temperature probe faces a cavity of said extrusion cylinder, said temperature probe being adapted to be in direct contact with the extrusion material contained in said cavity of said extrusion cylinder;

wherein said at least one temperature probe comprises at least one casing which is removably inserted in said extrusion cylinder and at least one thermocouple which is removably inserted in said at least one casing, said at least one casing being made of a thermally conductive and mechanically strong material adapted to withstand high temperatures in an order of 400° C. and high pressures up to 1000 bars; and wherein said extrusion cylinder comprises cooling fins which are arranged on an outer lateral surface thereof, said cooling fins having a thickness that can vary longitudinally with respect to an axis of said extrusion cylinder, and said cooling fins having a plurality of helical cuts which extend longitudinally with respect to the axis of said extrusion cylinder.

2. The extrusion machine according to claim 1, wherein said at least one casing is made of beryllium bronze.

3. The extrusion machine according to claim 1, wherein said at least one casing has an elongated shape which is adapted to withstand high pressures.

4. The extrusion machine according to claim 1, wherein said at least one casing is adapted to be screwed and unscrewed with respect to said extrusion cylinder for replacement.

5. The extrusion machine according to claim 1, wherein said extrusion cylinder and said cooling fins are provided in one piece.

6. The extrusion machine according to claim 1, further comprising a plurality of cooling fans, which are arranged longitudinally with respect to an axis of said extrusion cylinder discontinuously and alternately, said cooling fans each comprising an outlet which affects various portions of a lateral surface of said extrusion cylinder.

7. The extrusion machine according to claim 1 wherein said thermally conductive and mechanically strong material is adapted to withstand high temperatures.

8. The extrusion machine according to claim 1, wherein said cooling fins comprise a smaller thickness proximate to an initial part of said extrusion cylinder and a greater thickness proximate to an outlet of said extrusion cylinder.

9. The extrusion machine according to claim 8, wherein said cooling fins comprise a region transition from a configuration having said cooling fins with the smaller thickness to a configuration having said cooling fins with the greater thickness.

10. The extrusion machine according to claim 1, wherein said temperature probe faces said cavity that is internal to said extrusion cylinder and external to an extrusion screw.

* * * * *